July 23, 1935.  C. C. CHESLEY  2,009,163
DRAIN PIPE
Filed July 5, 1933
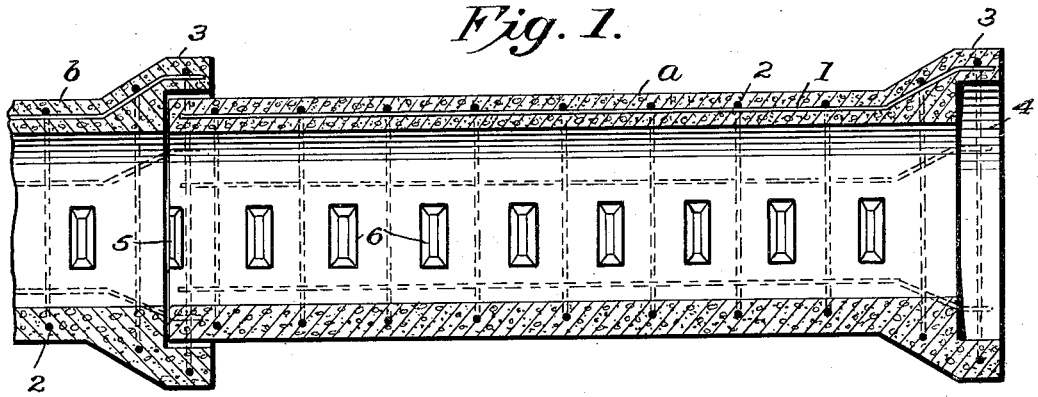
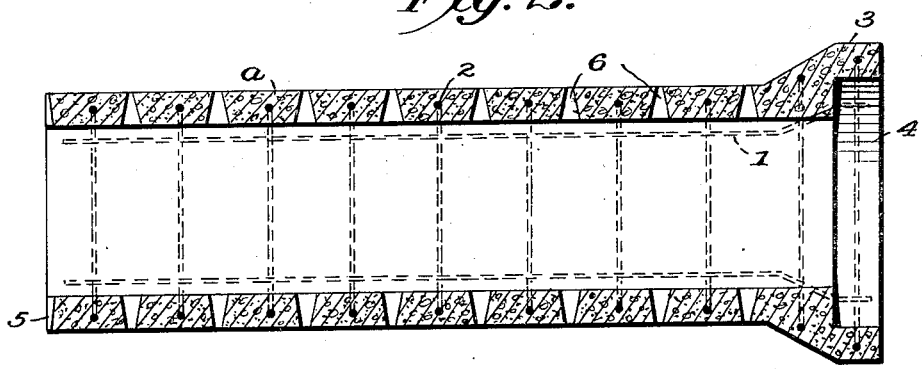
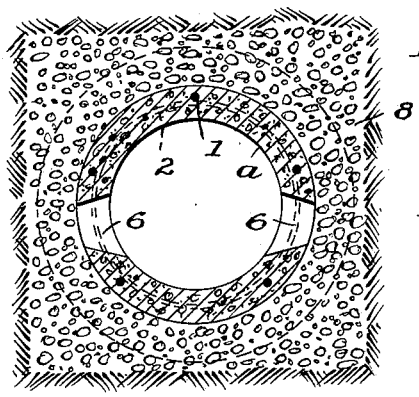
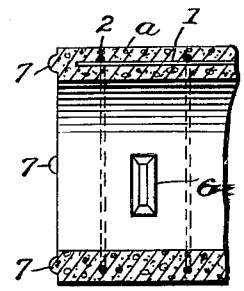
Inventor
Charles C. Chesley.
By Milans & Milans
Attorneys Patented July 23, 1935

2,009,163

UNITED STATES PATENT OFFICE 2,009,163

DRAIN PIPE

Charles C. Chesley, Waterbury Center, Vt.

Application July 5, 1933, Serial No. 679,105

2 Claims. (Cl. 61—10)

My invention relates to new and useful improvements in drain pipes and more particularly to a drain pipe formed of cement or other similar material and reinforced by metal inserts, the pipe being more particularly adapted for draining wet ground such as under road beds, foundations, or around retaining walls or the like.

The principal object of the invention resides in the provision of a pipe of the character described preferably formed in relative short sections permitting the same to be laid in straight line or in curved formation each section at one end being enlarged to provide a recess to receive the end of an adjacent section which is preferably loosely fitted therein to permit water to drain around the inserted end and into the interior of the pipe line.

A further object of the invention consists in the provision of a pipe or pipe section having a plurality of tapered or wedge-shaped openings which are smaller on the outside than on the inside thereby preventing clogging, the openings being positioned below the horizontal axis of the pipe or pipe sections thereby preventing any dirt or other matter entering the pipe or pipe section by gravity, the openings further being at right angles to the longitudinal axis of the pipe or pipe sections thereby giving less broken area in the pipe for the same area of openings, making the pipe stronger and adapting the same to be made by the well-known spinning process.

With the above and other objects in view, which will appear as the description proceeds, my invention consists in the novel details of construction, and arrangement of parts, described in the following specification and illustrated in the accompanying drawing, and while I have illustrated and described the preferred embodiments of the invention, as they now appear to me, it will be understood that such changes may be made as will fall within the scope of the appended claims.

In the drawing:—

Fig. 1 is a longitudinal vertical section through a complete pipe section and a portion of an adjacent section.

Fig. 2 is a horizontal section through one of the pipe sections.

Fig. 3 is a transverse vertical section through a pipe section, the pipe section being shown embedded in the ground; and Fig. 4 is a fragmental longitudinal vertical section showing a slightly modified form of my invention.

In the drawing $a$ and $b$ indicate pipe sections of similar construction, one end of the section $a$ being telescoped within an end of the section $b$ to form a continuous pipe line. The pipe sections are preferably formed of concrete or similar material reinforced by the longitudinally extending metal inserts 1 and the circumferentially extending metal inserts indicated at 2. At one end each of the sections is enlarged, as shown at 3, and provided with an internal recess 4 to receive the telescoped end of the adjacent section, as shown more particularly in Fig. 1 of the drawing, and the telescoped ends are preferably of a loose fit so that water may circulate around the inserted end of the pipe section and find its way through the openings 5 formed in the end of the section, into the interior of the pipe.

Each of the sections is provided on opposite sides with the longitudinally spaced wedge-shaped openings 6 which, as shown more clearly in Figs. 2 and 3 of the drawing, are smaller at their outer or inlet ends than at their inner or discharge ends and the openings at their outer or inlet ends are positioned below the horizontal center to prevent dirt or other matter from entering the pipe or pipe sections by gravity.

In Fig. 4 of the drawing I have shown a slightly modified form of my invention in which circumferentially spaced projections 7 are provided on the ends of the sections of smaller diameter and these projections are provided to space the telescoped ends of the pipe sections and to permit water to drain between the ends of the sections into the pipe. In other words these projections 7 are provided in the form of the invention shown in Fig. 4 instead of the notches or recesses 5 shown in Figs. 1 and 2.

In use the pipe sections are assembled with their adjacent ends telescoped, as shown more particularly in Fig. 1 of the drawing, and placed in the ground, as shown in Fig. 3, the pipe being preferably surounded by sand or gravel indicated at 8 which becomes saturated with water to be drained and permits the same to pass into the pipe through the openings 6 or around the ends of the telescoped pipe sections, as previously described. The openings 6 being positioned with their inlets below the horizontal central line prevents dirt or other matter from entering the openings by gravity and by having the openings at right angles to the longitudinal axis gives less broken area in the pipe for the same area of openings, makes the pipe stronger, and adapts the same to be made by the well-known spinning process. By having the openings 6 of the wedge-shaped formation there is no possibility of the openings becoming clogged as the water enters the openings. It will be noted that with the openings formed at opposite sides of the sections a perfectly smooth bottom portion is provided over which the water is drained through the pipe line. The pipe or pipe sections are primarily intended for what might be termed under drain where the pipe or sections are laid beneath the upper surface of the ground or under a road bed, foundation, wall, or the like. When so used they are usually embedded in the ground just a short distance below the upper surface and for this reason I find it necessary to provide a relatively strong pipe and to this end form the same of concrete or similar material reinforced by metal inserts. While I have described the telescoped ends of the sections as being loosely fit I wish it understood that when desired the telescoped ends might be sealed and when this is done all water must enter the pipe line through the longitudinally spaced openings 6. As previously stated I preferably form the sections of relatively short lengths so that they may be easily laid in a straight line, on a curve, or at an angle, and the sections may be made of varying diameters or of such diameters as may be found best for the particular purpose for which they are used.

Having fully described my invention what I claim as new and desire to secure by Letters Patent is:—

1. A pipe having an unbroken top portion and elongated longitudinally spaced side openings the walls of which are outwardly tapered from the inlet end to the discharge end thereof, the elongation of the openings being in a direction at right angles to the longitudinal axis of the pipe to provide relatively large unbroken vertical areas.

2. A pipe having an unbroken top portion and elongated longitudinally spaced side openings the walls of which are outwardly tapered from the inlet end to the discharge end thereof, the elongation of the openings being in a direction at right angles to the longitudinal axis of the pipe to provide relatively large unbroken vertical areas and the inlet ends of the openings positioned below the horizontal center of the pipe.

CHARLES C. CHESLEY.